(12) United States Patent
Choi

(10) Patent No.: US 11,234,164 B2
(45) Date of Patent: Jan. 25, 2022

(54) FORECASTING TRAFFIC DEMAND EXPERIENCED BY WIRELESS COMMUNICATION SYSTEM WITH APPLICATION TO CHANNEL ALLOCATION

(71) Applicant: Thomas Kyo Choi, Los Angeles, CA (US)

(72) Inventor: Thomas Kyo Choi, Los Angeles, CA (US)

( * ) Notice: Subject to any disclaimer, the term of this patent is extended or adjusted under 35 U.S.C. 154(b) by 155 days.

(21) Appl. No.: 15/929,328

(22) Filed: Apr. 27, 2020

(65) Prior Publication Data

US 2021/0337430 A1   Oct. 28, 2021

(51) Int. Cl.
*H04W 28/08* (2009.01)
*H04W 28/02* (2009.01)
*H04W 76/11* (2018.01)
*G06N 20/00* (2019.01)
*G06T 1/00* (2006.01)

(52) U.S. Cl.
CPC .......... *H04W 28/095* (2020.05); *G06N 20/00* (2019.01); *G06T 1/0007* (2013.01); *H04W 28/0231* (2013.01); *H04W 28/0942* (2020.05); *H04W 76/11* (2018.02)

(58) Field of Classification Search
CPC ........... H04W 28/095; H04W 28/0942; H04W 76/11; H04W 28/0231; G06N 20/00; G06T 1/0007
See application file for complete search history.

(56) References Cited

U.S. PATENT DOCUMENTS

| 9,451,473 | B2 | 9/2016 | Ouyang et al. | |
| 2018/0160332 | A1* | 6/2018 | Harris | H04L 67/06 |
| 2021/0035312 | A1* | 2/2021 | Zhuravlev | G06T 7/292 |

* cited by examiner

*Primary Examiner* — Asghar H Bilgrami
(74) *Attorney, Agent, or Firm* — S&F/WEHRW

(57) ABSTRACT

A traffic demand to be experienced by a base station (BS) at a target time instant is forecasted by obtaining a long-term component of the traffic demand and predicting a short-term component thereof. To predict the short-term component, a service area of the BS is imaged at an observation-making time instant earlier than the target time instant. The number of people captured in the image and located in the service area is determined. The BS collects identifiers of user equipments (UEs), such as media access control (MAC) addresses, to determine the number of UEs present at the observation-making time instant. The short-term component is computed from the number of people and the number of UEs via a mathematical function determined by a genetic algorithm or a machine-learning algorithm according to historical records. The forecasted traffic demand facilitates channel allocation for the BS.

17 Claims, 7 Drawing Sheets

Obtain a long-term component of the traffic demand (e.g., a sum of the trend component and the seasonality component). — 110

Predict a short-term component of the traffic demand. — 120

Update the long-term component. — 115

Forecast the traffic demand according to the long-term component and the short-term component. — 130

FORECASTING TRAFFIC DEMAND EXPERIENCED BY WIRELESS COMMUNICATION SYSTEM WITH APPLICATION TO CHANNEL ALLOCATION

LIST OF ABBREVIATIONS

AI Artificial intelligence
BS Base station
GUTI Globally Unique Temporary Identity
MAC Media access control
NN Neural network
UE User equipment

FIELD OF THE INVENTION

The present invention relates to method and system for forecasting incoming traffic to be experienced by a BS of a wireless communication system, and an application of the method to channel allocation.

BACKGROUND

In setting up and running a wireless communication system, such as a public mobile communication network or a private network realized with plural BS's, it is advantageous that radio resources, such as channels, allocated to an individual BS can match an incoming traffic demand. To achieve this advantage, an accurate forecast of the incoming traffic demand is first required. Existing forecasting techniques, such as the one disclosed in U.S. Pat. No. 9,451,473, uses data-mining techniques to analyze historical data to predict the future demand. The predicted traffic demand is usually a long-term one that indicates a long-term trend of traffic demand on the average. Short-term fluctuation of the traffic demand, however, is not easily modeled and predicted with sufficient accuracy. If the traffic demand to be experienced by a BS deviates from the predicted one, either the BS does not have sufficient channels to address the traffic demand, or it results in a waste of radio resources if the BS is over-equipped. It leads to customer dissatisfaction, and inefficient use of radio channels and capital investment.

In channel allocation, short-term prediction of incoming traffic is valuable to an operator of the wireless communication system as the operator can timely respond to emerging changes in traffic by adaptively redistributing channels among different BS's. There is a need in the art for a forecasting technique that enables short-term prediction of incoming traffic with improved accuracy. Short-term forecasts provided by the technique enables traffic-handling capacities of the BS's to be adjusted on-the-fly for addressing forthcoming traffic demands, which may increase or decrease over time, thereby advantageously enhancing customer satisfaction.

In one scenario, a BS under consideration can be rapidly reconfigured so as to quickly respond to a sudden change of traffic demand. For example, the BS is implemented with software-radio technologies. As such, the aforementioned technique is intended to predict a short-term burst of incoming traffic such that a traffic demand to be emerged in a few hours or less can be forecasted. That is, the prediction of the short-term burst is on a sub-daily scale. In another scenario, there is a time lag of days or weeks experienced by installing additional equipment in the BS to address an anticipated growth of traffic demand. The aforementioned technique is intended to provide an accurate short-term forecast of traffic demand to be experienced at a future time instant within a month from the present.

SUMMARY OF THE INVENTION

A first aspect of the present invention is to provide a method for forecasting a traffic demand to be experienced by a BS at a target time instant. The BS is used to provide wireless communication services over a service area.

The method comprises obtaining a long-term component of the traffic demand, predicting a short-term component of the traffic demand, and forecasting the traffic demand according to the long-term component and the short-term component. The short-term component is predicted on a first time scale shorter than a second time scale used in predicting the long-term component. In particular, the predicting of the short-term component comprises: (a) imaging at least a portion of the service area at an observation-making time instant to form one or more images, the observation-making time being earlier than the target time instant; (b) determining a number of people from the one or more images, wherein the people are distinct and are located in the service area; (c) collecting identifiers of UEs signed up with the BS; (d) determining a number of UEs present at the observation-making time instant from the collected identifiers; and (e) determining the short-term component according to the number of people and the number of UEs.

Preferably, the predicting of the short-term component further comprises: (f) obtaining historical records on past short-term components, past numbers of people and past numbers of UEs, wherein the past short-term components, past number of people and past numbers of UEs are measurement data obtained for time instants before the observation-making time instant; (g) determining a mathematical function of an input number of people and an input number of UEs for calculating an output that is a value of short-term component, wherein the mathematical function is a prototype function with a set of one or more characterizing parameters determined according to the historical records; and (h) computing the output by substituting the number of people and the number of UEs as the input number of people and the input number of UEs, respectively, into the determined mathematical function such that the short-term component is determined.

In certain embodiments, the prototype function is a weighted sum of candidate prototype functions. Weights of the candidate prototype functions are included in the set of one or more characterizing parameters. Preferably, the set of one or more characterizing parameters is determined by a genetic algorithm.

In certain embodiments, the prototype function is selected from plural candidate prototype functions according to the historical records. Preferably, the prototype function is selected from the candidate prototype functions by a machine-learning algorithm.

In certain embodiments, the prototype function is given by $f(x,y)=c \times y \times h(x)$ where: $f(x,y)$ is the prototype function with input variables x and y, where x is the input number of people and y is the input number of UEs; $h(x)$ is a function of x for modeling an effect of the input number of people to $f(x,y)$; and $c>0$ is a proportionality constant and is included in the set of one or more characterizing parameters.

In certain embodiments, the prototype function is given by $f(x,y)=\max(L, g(x,y))$ in which $g(x,y)=c \times y \times h(x)$, wherein: $f(x,y)$ is the prototype function with input variables x and y, where x is the input number of people and y is the input number of UEs; $f(x,y)$ is upper-bounded by a predetermined value L where L>0; $h(x)$ is a function of x for modeling an effect of the input number of people to $f(x,y)$; and c>0 is a proportionality constant and is included in the set of one or more characterizing parameters.

In certain embodiments, the method further comprises predicting a trend component and a seasonality component of the traffic demand such that the long-term component is obtained by a sum of the trend component and the seasonality component, wherein the trend component has a time scale longer than that of the seasonality component. Alternatively, the method may further comprise predicting a burst component, the trend component and the seasonality component of the traffic demand such that the long-term component is obtained by computing a first sum of the trend component and the seasonality component followed by multiplying the first sum with a second sum of one and the burst component, wherein the trend component has a time scale longer than that of the seasonality component. Yet alternatively, the method may further comprise predicting the trend component such that the long-term component is given by the trend component. In certain embodiments, the long-term component is selected to be a constant reference value.

In certain embodiments, the method further comprises updating the long-term component after the long-term component is obtained. The updating of the long-term component comprises: obtaining at least one past image of the service area; comparing the at least one past image with the one or more images so as to estimate a percentage change of built-up area on the service area as seen between the one or more images and the at least one past image; and inflating or deflating the long-term component according to the percentage change.

A second aspect of the present invention is to provide a method for allocating channels for a BS. The method comprises the steps of: (a) at a first time instant, forecasting a traffic demand to be experienced at a second time instant by the BS according to any of the embodiments of the traffic-demand forecasting method, wherein the first time instant is earlier than the second time instant, the first time instant is the observation-making time instant, and the second time instant is the target time instant; (b) determining a number of channels required by the BS to serve the forecasted traffic demand; (c) allocating the determined number of channels to the BS such that at the second time instant, the BS is operated with the determined number of channels; and (d) repeating the steps (a)-(c) with updated values of the first time instant and of the second time instant.

In certain embodiments, the second time instant is used as the updated value of the first time instant in the step (d) such that the determined number of channels allocated to the BS is regularly updated.

A third aspect of the present invention is to provide a system comprising a BS, one or more cameras, and one or more computers. The BS is used for providing wireless communications over a service area. The one or more cameras are used for imaging at least a portion of the service area. The BS and the one or more cameras are controllable by and communicable with the one or more computers.

In particular, the one or more computers are configured to execute a process for forecasting a traffic demand to be experienced by the BS at a target time instant. The process comprises obtaining a long-term component of the traffic demand, predicting a short-term component of the traffic demand, and forecasting the traffic demand according to the long-term component and the short-term component. The short-term component is predicted on a first time scale shorter than a second time scale used in predicting the long-term component. The predicting of the short-term component comprises: (a) controlling the one or more cameras to image at least the portion of the service area at an observation-making time instant to form one or more images, the observation-making time instant being earlier than the target time instant; (b) determining a number of people from the one or more images, wherein the people are distinct and are located in the service area; (c) controlling the BS to collect identifiers of UEs signed up with the BS; (d) determining a number of UEs present at the observation-making time instant from the collected identifiers; and (e) determining the short-term component according to the number of people and the number of UEs.

Preferably, the predicting of the short-term component further comprises: (f) obtaining historical records on past short-term components, past numbers of people and past numbers of UEs, wherein the past short-term components, past number of people and past numbers of UEs are measurement data obtained for time instants before the observation-making time instant; (g) determining a mathematical function of an input number of people and an input number of UEs for calculating an output that is a value of short-term component, wherein the mathematical function is a prototype function with a set of one or more characterizing parameters determined according to the historical records; and (h) computing the output by substituting the number of people and the number of UEs as the input number of people and the input number of UEs, respectively, into the determined mathematical function such that the short-term component is determined.

Other aspects of the present disclosure are disclosed as illustrated by the embodiments hereinafter.

Figure 1:
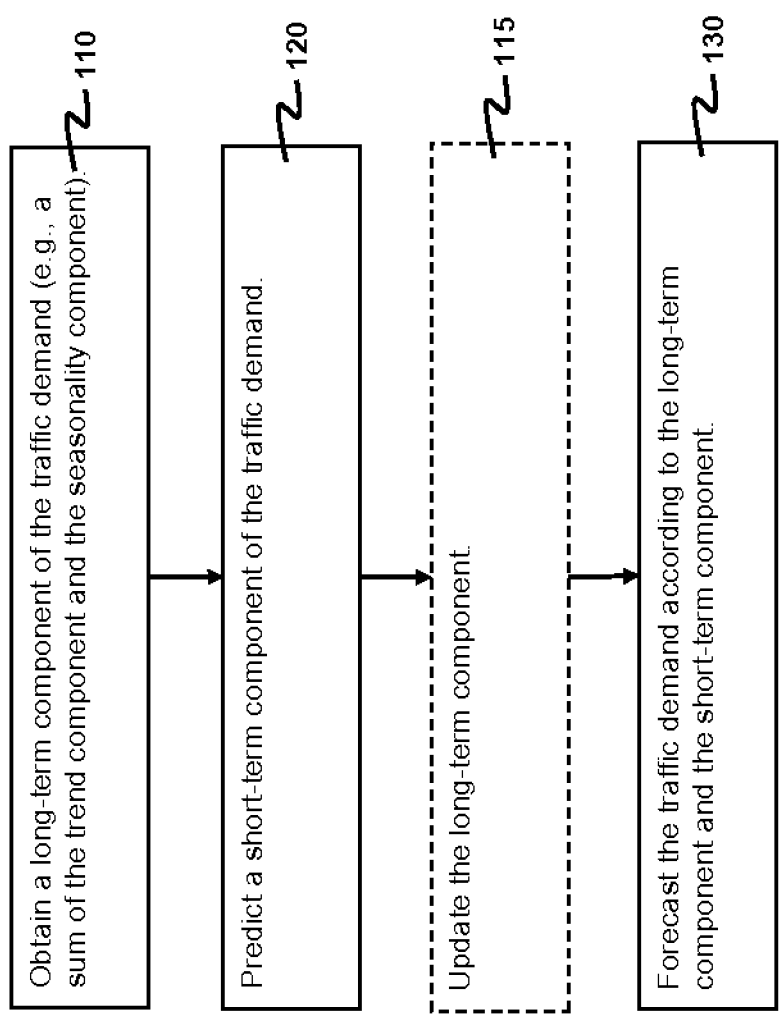
FIG. 1 depicts a flowchart showing exemplary steps used in the disclosed method for forecasting a traffic demand, where the steps include obtaining a long-term component of the traffic demand and computing a short-term component thereof.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The term "time scale" is occasionally used herein in the specification and appended claims. A time scale is commonly interpreted as a length of time during which an event happens, develops or is completed, or as a time allowed for or taken by a process or sequence of events. That a certain variable is predicted on a time scale of a certain time may be interpreted in a sense that values of the variable are predicted for different time instants where the time separation between successive time instants is on the order of magnitude of the aforementioned certain time.

Disclosed herein is a method for forecasting a traffic demand to be experienced by a BS. In particular, the traffic demand is predictable on time scales of a few hours or less, of a few days, and of a month, such that a short-term prediction of the traffic demand to be emerged in a few hours or less, in a few days or within a month is obtained. The BS is used in a wireless communication system, and is used for providing wireless communication services to mobile users over a service area. The service area is an area or a region such that users located within the service area are served by the BS. The service area is a cell if the wireless communication system is a cellular network. If sectorization is used to divide one cell into several sectors, the service area is one of the sectors.

Before the disclosed method is detailed, a review of a forecasting technique disclosed in U.S. Pat. No. 9,451,473 is made. In the technique of U.S. Pat. No. 9,451,473, a future traffic demand experienced by a wireless communication network is forecasted by means of machine learning and/or data mining. The network traffic is modeled by $$N(t)=(1+B(t))\times(T(t)+S(t)) \qquad (1)$$

where: N (t) represents a network traffic load or a traffic demand as a function of time; and B(t), T(t) and S(t) represent a burst component, a trend component and a seasonality component, respectively, of the traffic demand as a function of time. The trend component corresponds to a long-term trend of the traffic demand, for example, a weekly trend, a monthly trend or a yearly trend. The seasonality component corresponds to a periodicity of the traffic demand. The periodicity may have a weekly (seven day) period due to weekly trends in network usage. The burst component corresponds to a predictable outlier of the traffic demand from T(t)+S(t), such as traffic bursts occurred during holidays, special events or cultural events. The value of B(t) is simply assigned with a fixed value, e.g., 15% or 25%, for holidays, special events and cultural events. This approach of setting the B(t) value requires a prior knowledge of these holidays and events. The value of increased percentage in traffic is usually predicted from historical data obtained long time ago, and does not take into account any possible recent observation indicating potential factors that affect generation of traffics. Hence, the predicted value of N(t) is not particularly useful for short-term prediction of incoming traffic in a dynamically changing environment, especially in predicting the burst of traffic to occur in a few hours or less due to emergency or unexpected events.

Short-term prediction of the traffic demand can be more accurately made if an additional knowledge of environmental variables indicative to potential generation of traffic is obtained. The inventors have identified two environmental variables useful for more accurate prediction of the emerging traffic demand.

One environmental variable is the number of UEs signed up with the BS. After signing up with the BS, an individual UE is able to request the BS to provide the wireless communication services. A greater number of UEs is correlated to a higher traffic demand to be emerged. By having the UEs signed up with the BS, the BS is able to estimate the number of UEs capable of requesting the services from the BS. The number of UEs also reflects a dynamic change of landscape or economic development over the service area. For example, as more buildings are constructed on the service area, more economic activities occur on the service area, leading to a greater number of UEs.

Another environmental variable is the number of people located in the service area. If the number of people over a given area is higher, the people are closer together so that the people have a higher chance to interact. Furthermore, an area having a higher density of people is more likely to have a massive social event happened. The massive social event motivates the people to take videos for recording real-time progress of the social event, and to send the recorded videos to the people's social media. The aforementioned psychological motivation causes an increase in the traffic initiated by the people and handled by the BS.

A prediction model on which the disclosed method is based is expressed as $$N(t+\Delta t)=G(t)\times D(t+\Delta t) \qquad (2)$$

where: t is an observation-making time instant at which environmental variables are measured; t+Δt is a target time instant that the traffic demand is predicted for; N(t+Δt) is the traffic demand predicted for the time t+Δt; D (t+Δt) represents a long-term component of the traffic demand experienced at time t+Δt; and G (t) represents a short-term component of the traffic demand experienced at time t+Δt, and is estimated according to the environmental variables measured at time t. The long-term and short-term components are distinguished as follows. The short-term component G (t) is predicted on a first time scale shorter than a second time scale used in predicting the long-term component D (t+Δt). For example, the first time scale is a sub-daily scale or a daily scale while the second time scale is a monthly scale or a yearly scale.

Figure 2:
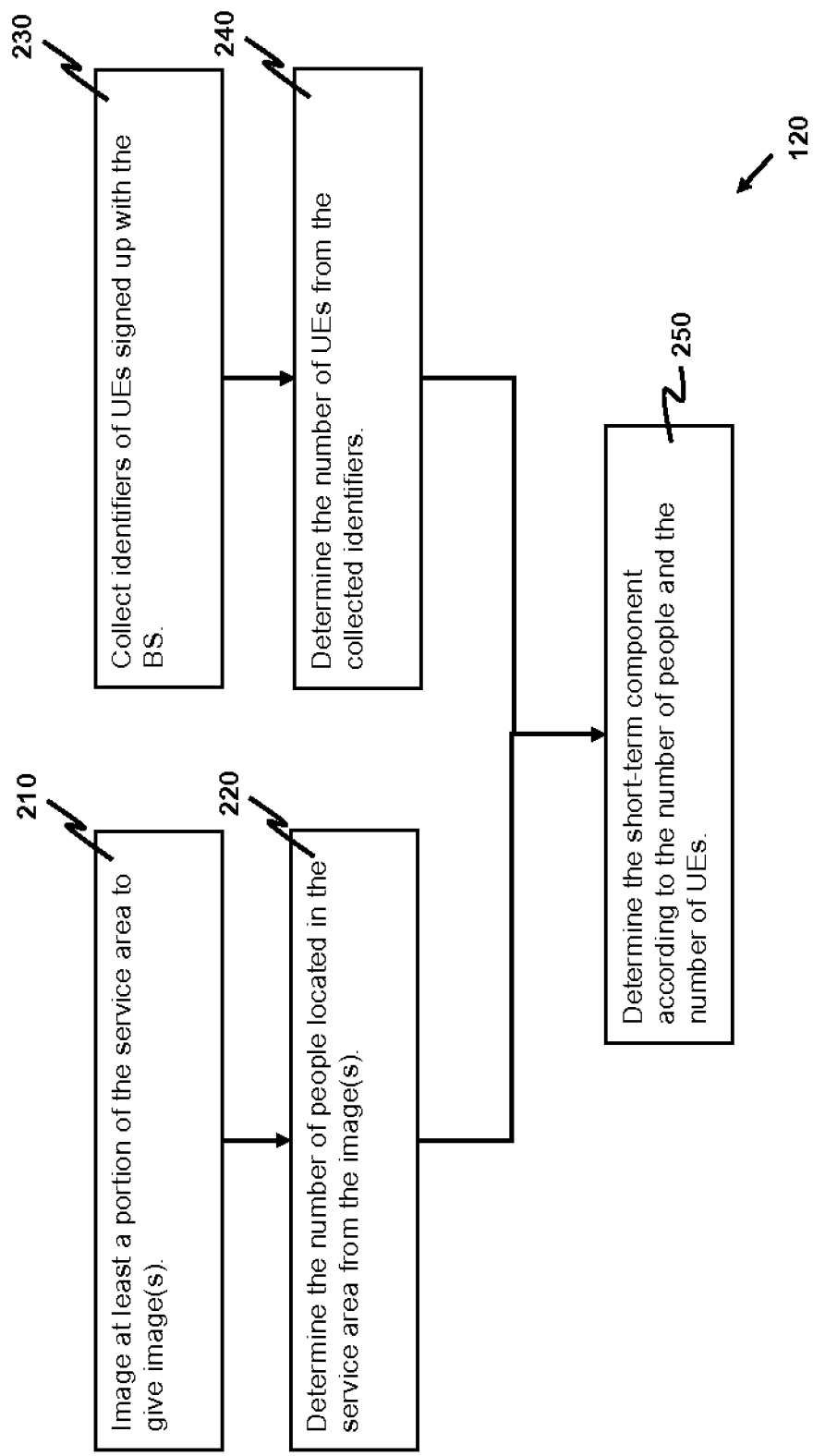
FIG. 2 depicts exemplary steps involved in predicting the short-term component of the traffic demand.

The disclosed method is exemplarily illustrated with the aid of FIGS. 1 and 2.

FIG. 1 depicts a flowchart showing exemplary steps used in forecasting the traffic demand experienced at a target time instant by the disclosed method. In a step 110, the long-term component of the traffic load to be experienced at the target time instant is obtained. In a step 120, the short-term component of the traffic demand experienced at the target time instant is predicted. Finally, the traffic demand is forecasted in a step 130 according to the obtained long-term component and the predicted short-term component. Exemplarily, the traffic demand is computed by EQN. (2).

Further details of the step 110 are given as follows. Since the time scale of the long-term component is longer than that of the short-term one, the selection of D (t+Δt) depends on the time scale intended to be used in predicting N(t+Δt). If it is intended to predict the traffic demand at the target time instant that is only a few hours, or less, ahead of the observation-making time instant, the prediction of N(t+Δt) is made on a sub-daily scale. One may select the long-term component to have a daily scale. As the seasonality component S(t) is predicted on a daily scale provided that S(t) is used to represent daily variation of the traffic demand over one week, the long-term component may be given by $$D(t+\Delta t)=T(t+\Delta t)+S(t+\Delta t). \qquad (3)$$

Although T(t) is of a weekly, monthly or yearly scale in general, the sum of T(t+Δt) and S(t+Δt) is of a daily scale due to the presence of S(t+Δt). Preferably, the burst of traffic demand due to forthcoming holidays, special events or cultural events is taken into consideration in determining the long-term component. It follows that D (t+Δt) may be given by $$D(t+\Delta t)=(1+B(t+\Delta t))\times(T(t+\Delta t)+S(t+\Delta t)). \quad (4)$$

If, on the other hand, Δt is on a scale of days or weeks, one may select the long-term component to have a monthly or yearly scale, viz., $$D(t+\Delta t)=T(t+\Delta t) \quad (5)$$

with the trend component T(t) being of a monthly or yearly scale. Note that EQN. (5) may also be used as the long-term component in the prediction of N(t+Δt) on the sub-daily scale. It has the following operational advantage. When a unified expression of D (t+Δt) is used for predicting N(t+Δt) regardless of whether Δt is a few hours, a few days, a few weeks or a month, only one expression of the short-term component G (t) is sufficient for all the aforementioned cases of Δt. In comparison, if different cases of Δt in time scale are separately considered, multiple expressions of G (t) are required, significantly increasing the computation effort required in analyzing historical data in order to obtain these G (t) expressions. In EQNS. (3)-(5), expressions of B(t+Δt), T(t+Δt) and S(t+Δt) may be derived according to the disclosure of U.S. Pat. No. 9,451,473, or by any data-mining technique for analyzing relevant historical data. Alternatively, a database on traffic-demand forecasts may be acquired or purchased from elsewhere, so that D (t+Δt) can be obtained therefrom.

Historical data available in practice usually include values of N(t) measured at different past time instants, but decomposition of each value of N(t) into respective values of D(t) and G(t) (or G(t−Δt)) may not be available due to various reasons. It makes determination of D (t+Δt) not easy. In such situation or similar ones, the long-term component may be assumed to be a constant, namely, $$D(t+\Delta t)=D_0 \quad (6)$$

where $D_0$ is a certain constant reference value. The value of $D_0$ may be conveniently selected to be the most-recent value of N(t) in the historical data, or the value of N(t) obtained at the observation-making time instant. Other choices of the reference value can also be used. Note that selecting a constant reference value to be the long-term component causes the time scale of the long-term component to be an infinite duration.

In the disclosed method, the trend component and the seasonality component of the traffic demand may be predicted such that the long-term component is obtained by a sum of the trend component and the seasonality component. The trend component has a time scale longer than that of the seasonality component. Alternatively, the disclosed method may predict the burst component, the trend component and the seasonality component of the traffic demand such that the long-term component is obtained by computing a first sum of the trend component and the seasonality component followed by multiplying the first sum with a second sum of one and the burst component. It is also possible that the disclosed method may predict the trend component such that the long-term component is given by the trend component.

In predicting the short-term component in the step 102, the number of UEs signed up with the BS and the number of people located in the service area are two data required to be measured. If the BS is equipped with one or more cameras, or if plural cameras are distributed over the service area, then the service area, or a major portion thereof, can be imaged and the number of people can be counted from the image. The counted number of people captured by the image is a good approximation of, or is informative to, the actual number of people located in the service area. When different UEs moves into or close to the service area and detect a beacon signal broadcast from the BS, there is an initialization procedure in most terrestrial mobile-communication protocols that the UEs send identifiers thereof to the BS for pairing with, or equivalently, signing up with, the BS such that the UEs may request the BS to provide wireless communication services. An individual identifier may be a MAC address of a smartphone (used as a UE), an identifier used in a mobile communication system such as GUTI, etc.

FIG. 2 depicts exemplary steps involved in the step 120 for predicting the short-term component of the traffic demand.

In a step 210, at least a portion of the service area is imaged at an observation-making time instant to form one or more images, where the observation-making time instant is earlier than the target time instant. In a step 220, a number of people is determined from the one or more images, where the people are distinct, and are located in the service area. In general, one or more cameras installed at the BS or distributed over the service area are used to perform imaging in the step 210. Preferably, the one or more cameras are located and oriented in order that the entire service area or a major portion thereof is imaged. In case multiple cameras are used, multiple images are obtained. The individual images may be merged together to form a single image for determination of the number of people in the step 220. It is also possible that the multiple images are directly used for determining the number of people. Multiple counting of the same person appeared in different images needs to be avoided. Apart from imaging the whole service area or a part thereof, an area larger than the service area may be imaged. In determining the number of people, those people captured on the one or more images but located outside the service area are not counted. In carrying out the step 220, an automatic computer-implemented technique is usable to differentiate different people on the one or more images and count the people. Examples of such technique may be found in the art, e.g., U.S. Pat. Nos. 7,466,844 and 8,411,963.

In a step 230, identifiers of UEs signed up with the BS are collected. As mentioned above, an individual UE signs up with, or registers itself with, the BS upon the individual UE responding to a detected beacon signal sent from the BS. In the sign-up process, at least one identifier of the individual UE is sent to the BS for identification and authentication processes. Hence, the BS is enabled to determine if the UE that is signed up is a UE or not. From the collected identifiers, a number of UEs present at the observation-making time instant is determined in a step 240.

In a step 250, the short-term component is determined according to the number of people as determined in the step 220, and the number of UEs as found in the step 240. Specifically, a mathematical relationship, as elaborated as follows, is used to compute the short-term component from the number of people and the number of UEs.

Figure 3:
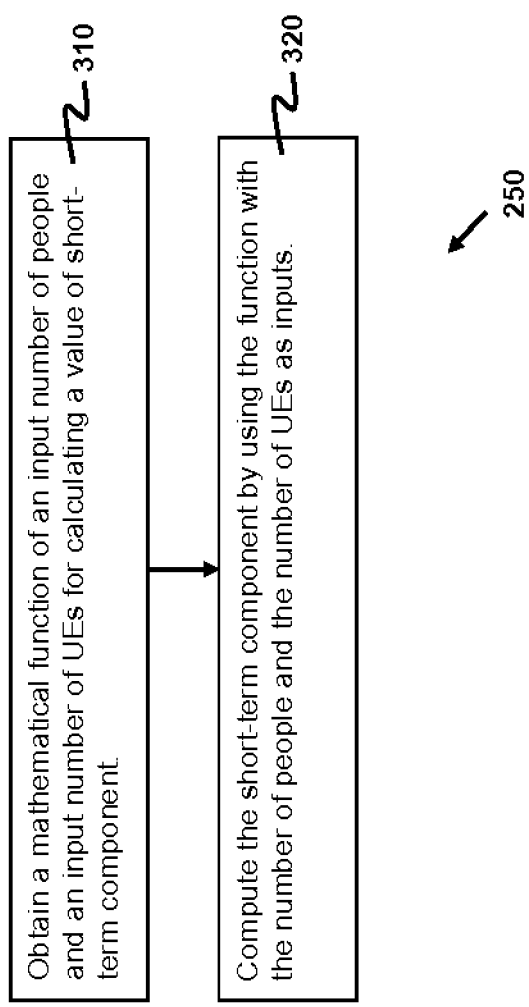
FIG. 3 illustrates a flow of steps for computing the short-term component by using a mathematical function in accordance with certain embodiments of the present invention.

To enable rapid computation of the short-term component in the step 250, it is preferable to use a simple mathematical relationship in terms of the determined numbers of people and of UEs for computing the short-term component. FIG. 3 depicts a realization of the step 250 in which a mathematical relationship is used in the computation of short-term component in accordance with certain embodiments of the present invention. In a step 310, a mathematical function of an input number of people and an input number of UEs is obtained. The mathematical function is used for calculating an output that is a value of short-term component. In a step 320, the output is computed by substituting the number of people and the number of UEs as the input number of people and the input number of UEs, respectively, into the determined mathematical function. The computed output gives the short-term component determined for the step 250.

Figure 4:
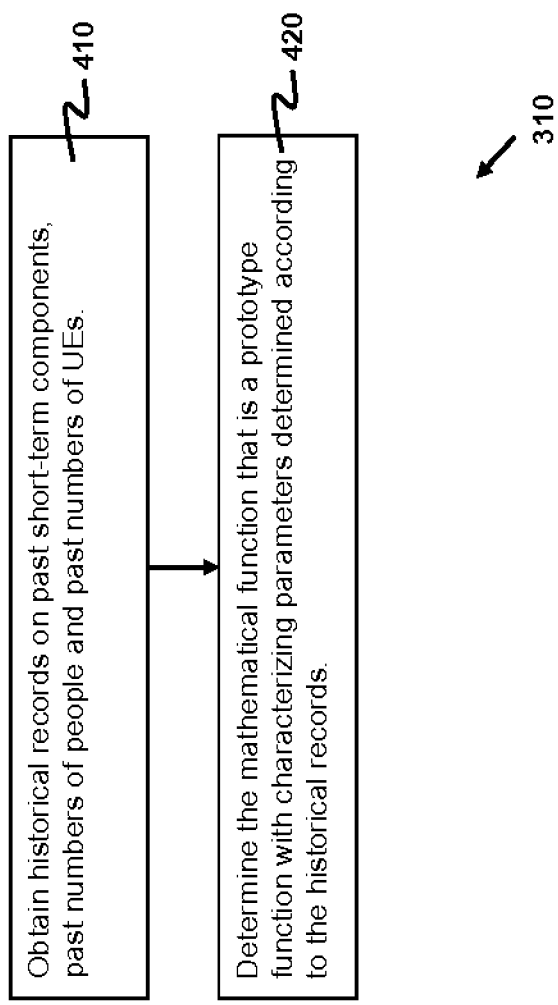
FIG. 4 illustrates a flow of steps for determining the mathematical function based on historical data in accordance with certain embodiments of the present invention.

Preferably, the mathematical function is determined according to historical data that are collected. FIG. 4 depicts a realization of the step 310 based on the historical data in accordance with certain embodiments of the present invention. In a step 410, historical records on past short-term components, past numbers of people and past numbers of UEs are obtained. In particular, the past short-term components, past number of people and past numbers of UEs are measurement data obtained for time instants before the observation-making time instant. As mentioned above, it may happen that the historical data has records on past traffic loads but neither on the past short-term components nor on past long-term components. In such situation, the past long-term components are assumed to have a constant reference value such that the past short-term components can be computed from the past traffic loads by EQN. (2). In the step 420, the mathematical function is determined from a prototype function. The prototype function is a two-variable function containing one or more parameters for characterizing the function, e.g., $f(x,y)=x+y+axy+bx^2$ or $f(x,y)=\log(ax)+by^2$ where: $f(x,y)$ is the prototype function of x and y; x and y are input variables; and a and b are characterizing parameters. In particular, the mathematical function is the prototype function with a set of one or more characterizing parameters determined according to the historical records. Usually, the set of one or more characterizing parameters is estimated by using a curve fitting technique to fit the historical records to the prototype function such that the prototype function with the estimated characterizing-parameter set minimizes a certain metric, such as a root-mean-square error.

Some practical choices of the prototype function are provided as follows. Denote $f(x,y)$ as a prototype function with input variables x and y where x is the input number of people and y is the input number of UEs. Note that x and y are constrained by $x \geq 0$ and $y \geq 0$, respectively. Denote $z=f(x,y)$ as the value of short-term component computed for x and y.

In general, $f(x,y)$ is a nonlinear function. A general choice of $f(x,y)$ is given by $$f(x, y) = \sum_{i \geq 0, j \geq 0} a_{i,j} x^i y^j \qquad (7)$$

where $a_{i,j}$'s are characterizing parameters.

Note that when the number of UEs at the observation-making time instant is zero, there is no traffic demand at the observation-making time instant although it is uncertain whether the traffic demand is still zero at the target time instant. However, it is noticed that having no UE signed up with the BS is a rare case. One may make an assumption for this rare case that the predicted traffic demand at the target time instant is also zero such that $f(x,y)$ is simplified, thus potentially simplifying the determination of $f(x,y)$ from the historical records in the step 420. It follows that $f(x, 0)=0$. One form of $f(x,y)$ satisfying $f(x, 0)=0$ is $$f(x, y) = y^b \times \sum_{i \geq 0, j \geq 0} a_{i,j} x^i y^j \qquad (8)$$

where b and $a_{i,j}$'s are characterizing parameters with $b \geq 1$.

To further simply $f(x,y)$ in order to reduce computation in performing the step 420, one may assume that the number of people and the number of UEs independently affects the traffic demand, or the short-term component thereof. This assumption is reasonable in that the number of people is related to psychological motivation of mobile users to communicate whereas the number of UEs reflects the number of data-traffic sources in generating the traffic. Furthermore, the number of data-traffic sources is often roughly proportional to the traffic demand. It follows that $f(x,y)$ may take the form of $$f(x,y)=c \times y \times h(x) \qquad (9)$$

where: h(x) is a certain function of x, and models an effect of the input number of people to the value of short-term component as computed by $f(x,y)$; and $c>0$ is a proportionality constant, which is one of the characterizing parameters. In general, h(x) is a nonlinear function.

As the number of people identified from the one or more images in the step 220 increases, the density of people over the service area increases, indicating more opportunities for the people to interact and/or a higher chance that a social event is happening. One may assume that h(x) is an increasing function. Furthermore, the psychological desire to make communication does not increase proportionally as the number of people increases. It is more likely that the rate of increase in the desire to communication diminishes as the number of people increases. One may assume that h(x) is an increasing function taking a shape that is concave downward. That is, h(x) is both an increasing function and a concave function. Some forms of h(x) that is both increasing and concave are:

$$h(x)=a_1\sqrt{x}, \qquad (10)$$

$$h(x)=a_1 \log(1+a_2 x), \qquad (11)$$

$$h(x)=a_1/(1+\exp(-a_2 x)) \qquad (12)$$

and $$h(x)=a_1 \arctan(a_2 x), \qquad (13)$$

where $a_1$ and $a_2$ are characterizing parameters with $a_1>0$ and $a_2>0$. Note that EQNS. (10)-(13) do not form an exhaustive list; other forms of h(x) are possible.

It is possible that the motivation of people to make communication increases sharply when the density of people reaches a certain point. In such scenario, the rate of increase in h(x) does not increase considerably when x is close to zero, rises notably when x is around the aforesaid certain point, and finally flats out when x increases further. One form of h(x) fitting the aforementioned rate of increase is $$h(x)=a_1/(1+\exp(-a_2(x-a_3))) \qquad (14)$$

where $a_1$, $a_2$ and $a_3$ are characterizing parameters with $a_1>0$, $a_2>0$ and $a_3>0$. Other forms of h(x) are possible.

In practice, it is expected that $f(x,y)$ is upper-bounded by a certain predetermined value L where L>0. A choice of $f(x,y)$ is then given by $$f(x,y) = \max(L, g(x,y)) \qquad (15)$$

where $g(x,y)$ is a certain function of x and y. For example, an expression of $f(x,y)$ given by any one of EQNS. (7)-(9) with $h(x)$ given by EQNS. (10)-(14) may be used as $g(x,y)$. Since EQN. (9) provides an expression of $f(x,y)$ that reduces computation in performing the step 420, it is preferable to substitute this expression of $f(x,y)$ as $g(x,y)$ into EQN. (15) such that a computation requirement in determining the mathematical function from the prototype function is reduced.

It may be difficult for those skilled in the art to initially determine which one form of $f(x,y)$ is appropriate for the practical situation under consideration. To enable those skilled in the art to more easily determine a suitable form of $f(x,y)$, preferably the prototype function is given by a weighted sum of candidate prototype functions, where weights of the candidate prototype functions are included in the set of one or more characterizing parameters. A candidate prototype function is a prototype function to be tested whether this prototype function is a sufficiently good fit to the historical records. If the candidate prototype function is not a good prototype function to be used, the corresponding weight of this candidate prototype function becomes close to zero, thus removing the influence of this candidate prototype function to the final prototype function. It is also possible that in certain situations, each of the candidate prototype functions alone does not sufficiently closely fit all the historical records, but a weighted combination of the candidate prototype functions does. Mathematically, $f(x,y)$ is given by $$f(x, y) = \sum_i m_i \times f_i(x, y) \qquad (16)$$

where $f_i(x,y)$ is the ith candidate prototype function, and $m_i$ is the weight of $f_i(x,y)$.

Since multiple candidate prototype functions are involved in the prototype function, the amount of computation required in estimating the set of one or more parameters (including the weights) may be considerable. Preferably, the set of one or more characterizing parameters is determined by a genetic algorithm. The genetic algorithm is an AI technique. In the genetic algorithm, characterizing parameters for each candidate prototype function are optimized to form one candidate solution. Plural candidate solutions are thus formed. Mutations and alterations of the candidate solutions as typically used by the genetic algorithm are used to find an acceptable weighted combination of the candidate prototype functions to form the mathematical function used for computing the short-term component in the step 320.

Apart from forming the porotype function by the weighted combination of the candidate prototype functions, alternatively the prototype function may be formed by selecting a most appropriate one from a large pool of candidate prototype functions. A first approach to determine the most appropriate candidate prototype function is to compare degrees of fitness to the historical records for the candidate prototype functions. A second approach is to use an AI technique, in particular a machine-learning algorithm. Usually, an individual candidate prototype function is more suitable to fitting historical data that exhibit a certain type of data pattern than other types. If a mapping between the candidate prototype functions and different types of data pattern is identified, selection of the most appropriate candidate prototype function for fitting the historical records may be simplified by first finding out the data pattern exhibited by the historical records. To implement the second approach, data mining is used to identify a massive number of relevant data for training a NN that implements the machine-learning algorithm. The NN learns the aforementioned mapping from the training data. When the historical records are presented to the NN, the most appropriate candidate prototype function may be more quickly identified. The mathematical function is then obtained.

Figure 5:
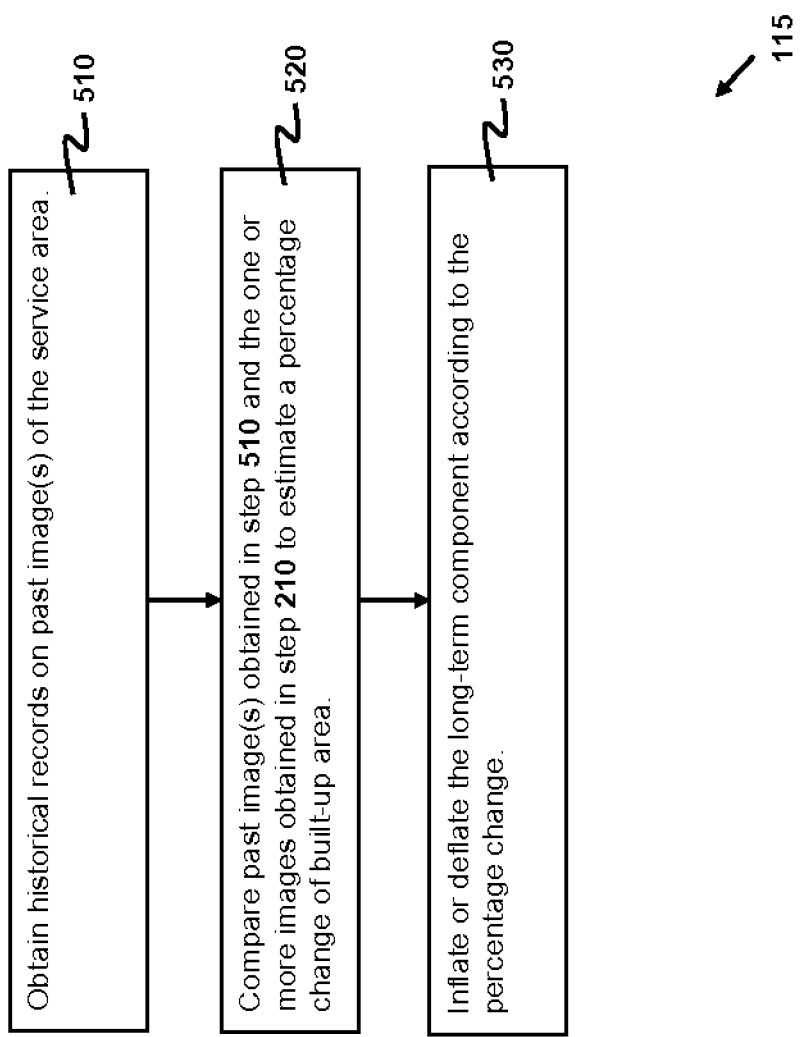
FIG. 5 depicts exemplary steps of updating the long-term component in forecasting the traffic demand.

In the step 210, the one or more images for imaging the service area are formed. Apart from being used in predicting the short-term component, the one or more images may also be utilized for updating the long-term component by detecting if there is any new building on the service area. The presence of a new building implies a potential increase in traffic demand, but may also reduce the traffic demand if the new building blocks the signals generated by the BS from reaching users located at a shadow of the new building. Hence, the traffic demand is correlated to the size of service area covered with buildings as seen from the one or more images, especially when the one or more images form a bird eye's view from an antenna of the BS. Refer to FIG. 1. After the long-term component is obtained in the step 110, optionally the long-term component is updated in a step 115. FIG. 5 depicts exemplary steps taken in the step 115. In a step 510, at least one past image of the service area is obtained from historical records or archives. In a step 520, the at least one past image obtained in the step 510 is compared with the one or more images obtained in the step 210. In particular, the at least one past image is used to estimate a first ratio of built-up area to service area in the past. Similarly, the one or more images are used to estimate a second ratio of built-up area to service area. The built-up area is a region, or an aggregation of regions, on which there are buildings as seen in image(s) under consideration. By comparing the first and second ratios, one can estimate a percentage change of built-up area on the service area as seen between the one or more images and the at least one past image. A greater percentage change indicates that an actual value of the long-term component has a greater deviation from the value of the long-term component obtained in the step 110. A positive value of the percentage change implies that the value of long-term component obtained in the step 110 is likely to be underestimated. Similarly, a negative value implies that the value obtained in the step 110 is likely to be overestimated. The long-term component is inflated or deflated according to the percentage change in a step 530. The long-term component is thereby updated. Optionally, inflation or deflation of the long-term component is performed only if the percentage change is not marginal or negligible, that is, if the percentage change has a magnitude greater than a predetermined threshold.

Figure 6:
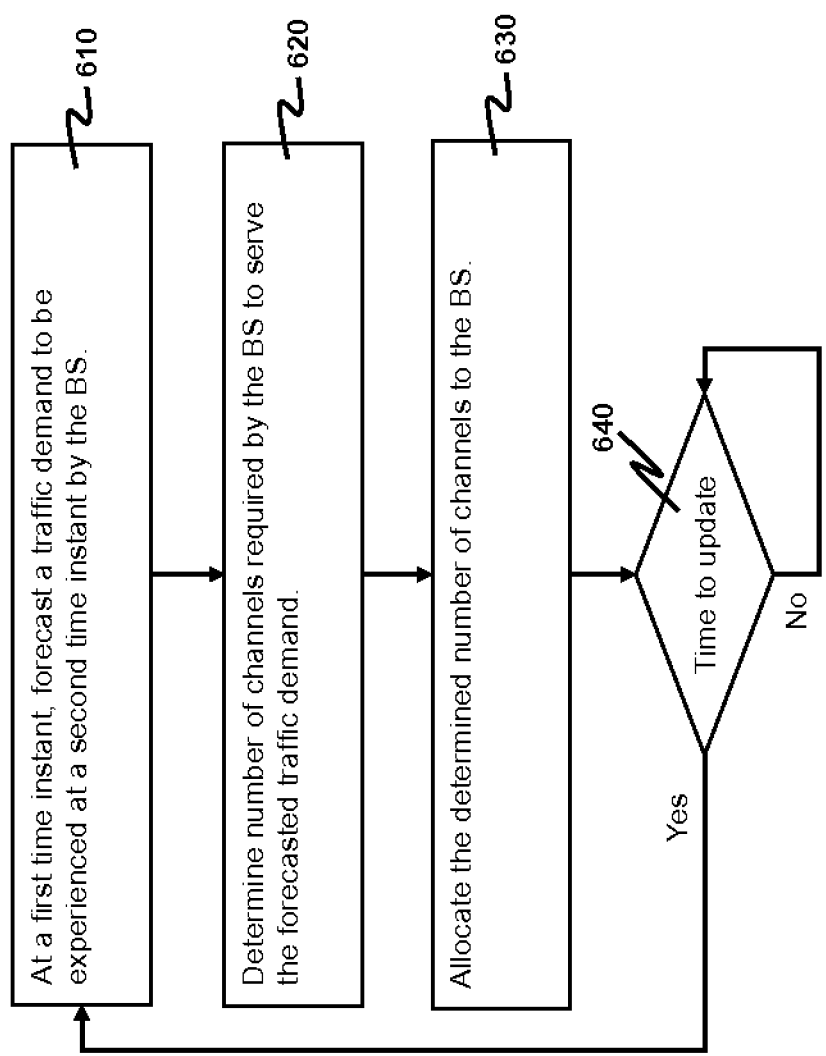
FIG. 6 depicts a flowchart for illustrating exemplary steps of a method for allocating channels for a BS, where the channels are allocated according to the forecasted traffic demand.

An application of the traffic demand forecasted by the disclosed method is to facilitate channel allocation in a wireless communication system. A channel may be a contiguous piece of radio spectrum, a sequence of time slots, a combination of allocated frequency band and dedicated time slots, or any radio resource as considered relevant by those skilled in the art. A method for allocating channels for a BS is detailed as follows. FIG. 6 depicts a flowchart showing exemplary steps of the channel-allocating method.

In a step 610, a traffic demand to be experienced at a second time instant is forecasted at a first time instant, where the first time instant is earlier than the second time instant. The time difference between the first and second time instants is less than a month in general. In some practical situations, the time difference is a few days, a few hours, or even less. The time difference may be determined by those skilled in the art according to practical situations under consideration. The traffic demand is forecasted according to any of the embodiments of the traffic-demand forecasting method as disclosed above, where the first time instant is the observation-making time instant and the second time instant is the target time instant.

After the traffic demand to be experienced at the second time instant is forecasted in the step 610, a number of channels required by the BS to serve the forecasted traffic demand is determined in a step 620. Afterwards, the determined number of channels are allocated to the BS in a step 630. Channel allocation is accomplished on or before the second time instant such that at the second time instant, the BS is operated with the determined number of channels.

Channel allocation is performed regularly such that channels are regularly re-allocated to address dynamic changes in traffics. After a certain time duration lapses (step 640), an update on the channel allocation scheme is scheduled to initiate. The steps 610, 620 and 630 are repeated with updated values of the first time instant and of the second time instant. In certain embodiments, the second time instant is used as the updated value of the first time instant such that the determined number of channels allocated to the BS is regularly updated.

Figure 7:
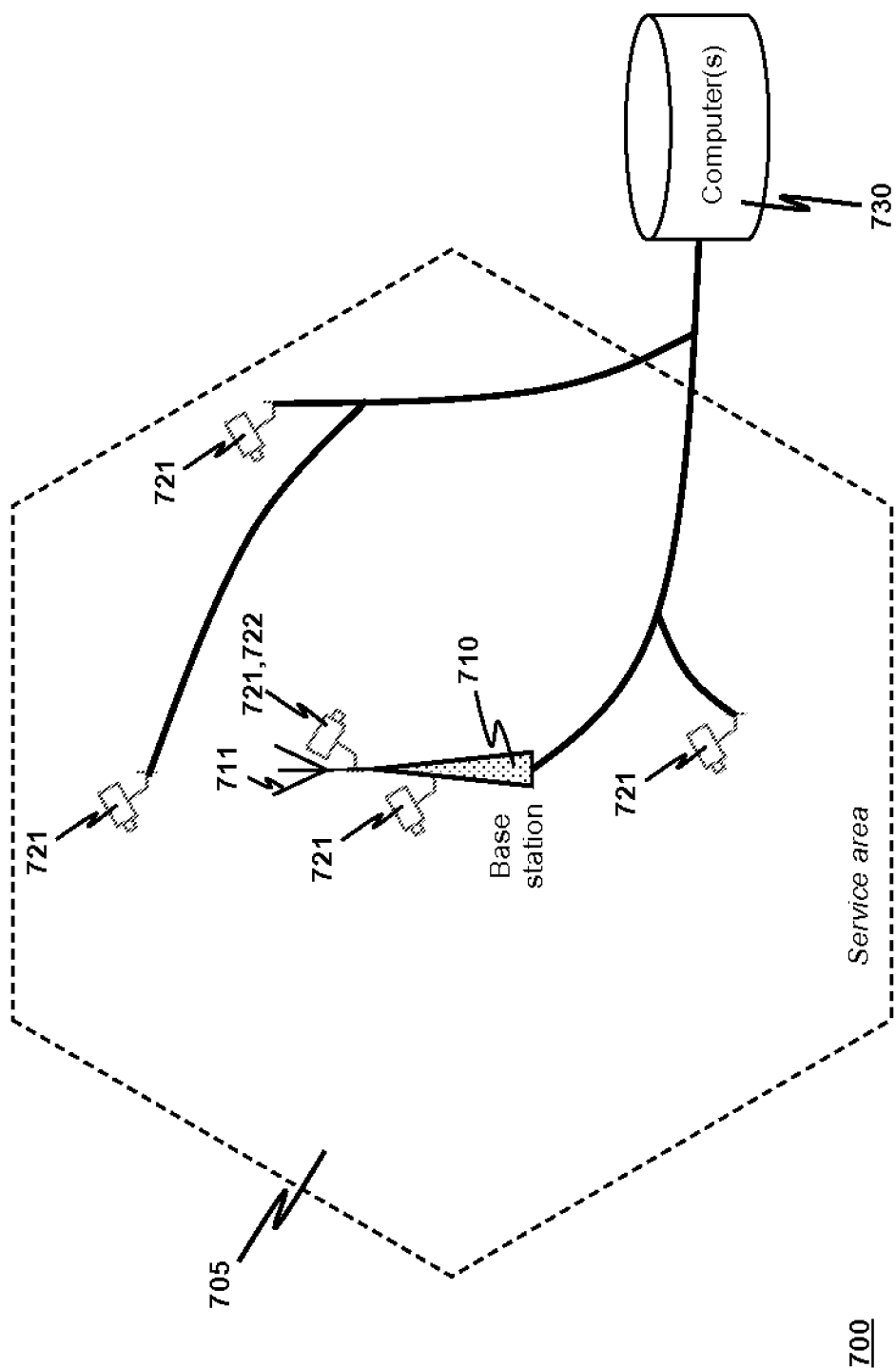
FIG. 7 depicts a system for realizing the disclosed methods for forecasting the traffic demand and for allocating the channels.

The disclosed methods for forecasting the traffic demand and for channel allocation are implementable by a system 700 as depicted in FIG. 7. The system 700 comprises a BS 710, one or more cameras 721, and one or more computers 730. The BS 710 is used to provide wireless communication services over a service area 705. The one or cameras 721 are used to image at least a portion of the service area 705. The one or more cameras 721 may be installed at the BS 710 or distributed over the service area 705. It is also possible that the one or more cameras 721 are distributed over both the service area 705 and the BS 710. In one implementation option, part or all of the one or more cameras 721 are installed at an antenna 711 of the BS 710 (e.g., a camera 722). It enables the camera 722 to image a portion of the service area 705 where the portion of the service area 705 is covered by the antenna 711. The one or more computers 730 are communicable with the BS 710 and the one or more cameras 721. The BS 710 and the one or more cameras 721 are controllable by the one or more computers 730. The BS 710 is used to execute the step 230. The one or more cameras 730 are used to execute the step 210. The one or more computers 730 are configured to execute the steps 110, 115, 130, 220, 240, 250, 310, 320, 410, 420, 510, 520, 530, 620, 630, and 640. In addition, the one or more computers 730 are further configured to execute the step 120 via controlling the one or more cameras 721 to perform the step 210 and controlling the BS 710 to perform the step 230. Accordingly, the one or more computers 730 are additionally configured to execute the step 610.

The BS 710 may be installed outdoors or indoors. The BS 710 may be located at a fixed location or may be relocatable. A relocatable BS may be a mobile BS as described in U.S. Pat. No. 7,852,808. An individual computer selected from the one or more computers 730 may be a standalone desktop computer, a workstation, a dedicated computer, a computing server, a distributed server in a computing cloud, or any programmable computing device as deemed appropriate by those skilled in the art. The individual computer may be installed in the BS 710 or elsewhere. A fixed communication line, such as an optical fiber link, may be used to connect the individual computer with the BS 710 or any one of the one or more cameras 721 for facilitating communication. It is also possible that the one or more computers 730, the BS 710 and the one or more cameras 721 are networked together through a data communication network, private or public.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A method for forecasting a traffic demand to be experienced by a base station (BS) at a target time instant, the BS being used to provide wireless communication services over a service area, the method comprising:
    obtaining a long-term component of the traffic demand;
    predicting a short-term component of the traffic demand, wherein the short-term component is predicted on a first time scale shorter than a second time scale used in predicting the long-term component; and
    forecasting the traffic demand according to the long-term component and the short-term component;
    wherein the predicting of the short-term component comprises:
    imaging at least a portion of the service area at an observation-making time instant to form one or more images, the observation-making time instant being earlier than the target time instant;
    determining a number of people from the one or more images, wherein the people are distinct and are located in the service area;
    collecting identifiers of user equipments (UEs) signed up with the BS;
    determining a number of UEs present at the observation-making time instant from the collected identifiers; and
    determining the short-term component according to the number of people and the number of UEs.

2. The method of claim 1, wherein the predicting of the short-term component further comprises:
    obtaining historical records on past short-term components, past numbers of people and past numbers of UEs, wherein the past short-term components, past number of people and past numbers of UEs are measurement data obtained for time instants before the observation-making time instant;
    determining a mathematical function of an input number of people and an input number of UEs for calculating an output that is a value of short-term component, wherein the mathematical function is a prototype function with a set of one or more characterizing parameters determined according to the historical records; and
    computing the output by substituting the number of people and the number of UEs as the input number of people and the input number of UEs, respectively, into the determined mathematical function such that the short-term component is determined.

3. The method of claim 2, wherein the prototype function is a weighted sum of candidate prototype functions, weights of the candidate prototype functions being included in the set of one or more characterizing parameters.

4. The method of claim 3, wherein the set of one or more characterizing parameters is determined by a genetic algorithm.

5. The method of claim 2, wherein the prototype function is selected from plural candidate prototype functions according to the historical records.

6. The method of claim 5, wherein the prototype function is selected from the candidate prototype functions by a machine-learning algorithm.

7. The method of claim 2, wherein the prototype function is given by $f(x,y)=c \times y \times h(x)$ where:
- $f(x,y)$ is the prototype function with input variables x and y, where x is the input number of people and y is the input number of UEs;
- $h(x)$ is a function of x for modeling an effect of the input number of people to $f(x,y)$; and
- $c>0$ is a proportionality constant and is included in the set of one or more characterizing parameters.

8. The method of claim 2, wherein the prototype function is given by $f(x,y)=\max(L, g(x,y))$ in which $g(x,y)=c \times y \times h(x)$, wherein:
- $f(x,y)$ is the prototype function with input variables x and y, where x is the input number of people and y is the input number of UEs;
- $f(x,y)$ is upper-bounded by a predetermined value L where $L>0$;
- $h(x)$ is a function of x for modeling an effect of the input number of people to f(x,y); and
- $c>0$ is a proportionality constant and is included in the set of one or more characterizing parameters.

9. The method of claim 1 further comprising:
predicting a trend component and a seasonality component of the traffic demand such that the long-term component is obtained by a sum of the trend component and the seasonality component, wherein the trend component has a time scale longer than that of the seasonality component.

10. The method of claim 1 further comprising:
predicting a burst component, a trend component and a seasonality component of the traffic demand such that the long-term component is obtained by computing a first sum of the trend component and the seasonality component followed by multiplying the first sum with a second sum of one and the burst component, wherein the trend component has a time scale longer than that of the seasonality component.

11. The method of claim 1 further comprising:
predicting a trend component of the traffic demand such that the long-term component is given by the trend component.

12. The method of claim 1, wherein the long-term component is selected to be a constant reference value.

13. The method of claim 1 further comprising:
after the long-term component is obtained, updating the long-term component, wherein the updating of the long-term component comprises:
obtaining at least one past image of the service area;
comparing the at least one past image with the one or more images so as to estimate a percentage change of built-up area on the service area as seen between the one or more images and the at least one past image; and
inflating or deflating the long-term component according to the percentage change.

14. A method for allocating channels for a base station (BS) comprising the steps of:
(a) at a first time instant, forecasting a traffic demand to be experienced at a second time instant by the BS according to the method of claim 1, wherein the first time instant is earlier than the second time instant, the first time instant is the observation-making time instant, and the second time instant is the target time instant;
(b) determining a number of channels required by the BS to serve the forecasted traffic demand;
(c) allocating the determined number of channels to the BS such that at the second time instant, the BS is operated with the determined number of channels; and
(d) repeating the steps (a)-(c) with updated values of the first time instant and of the second time instant.

15. The method of claim 14, wherein the second time instant is used as the updated value of the first time instant in the step (d) such that the determined number of channels allocated to the BS is regularly updated.

16. A system comprising:
a base station (BS) for providing wireless communications over a service area;
one or more cameras for imaging at least a portion of the service area; and
one or more computers, the BS and the one or more cameras being controllable by and communicable with the one or more computers;
wherein the one or more computers are configured to execute a process for forecasting a traffic demand to be experienced by the BS at a target time instant, the process comprising:
obtaining a long-term component of the traffic demand;
predicting a short-term component of the traffic demand, wherein the short-term component is predicted on a first time scale shorter than a second time scale used in predicting the long-term component; and
forecasting the traffic demand according to the long-term component and the short-term component;
wherein the predicting of the short-term component comprises:
controlling the one or more cameras to image at least the portion of the service area at an observation-making time instant to form one or more images, the observation-making time instant being earlier than the target time instant;
determining a number of people from the one or more images, wherein the people are distinct and are located in the service area;
controlling the BS to collect identifiers of user equipments (UEs) signed up with the BS;
determining a number of UEs present at the observation-making time instant from the collected identifiers; and
determining the short-term component according to the number of people and the number of UEs.

17. The system of claim 16, wherein the predicting of the short-term component further comprises:
obtaining historical records on past short-term components, past numbers of people and past numbers of UEs, wherein the past short-term components, past number of people and past numbers of UEs are measurement data obtained for time instants before the observation-making time instant;
determining a mathematical function of an input number of people and an input number of UEs for calculating an output that is a value of short-term component, wherein the mathematical function is a prototype function with a set of one or more characterizing parameters determined according to the historical records; and
computing the output by substituting the number of people and the number of UEs as the input number of people and the input number of UEs, respectively, into the determined mathematical function such that the short-term component is determined.

* * * * *